United States Patent [19]
Kirilishin et al.

[11] 3,754,952
[45] Aug. 28, 1973

[54] METHOD OF OBTAINING CHEMCIAL RESISTANT CONCRETE

[76] Inventors: Vsevolod Petrovich Kirilishin, spusk Zhanny Lyaburb, 6, kv. 4, Odessa; Nikolai Ivanovich Khitarov, ulitsa Malaya Yakimanka, 3, kv. 11, Moscow, both of USSR

[22] Filed: July 15, 1970

[21] Appl. No.: 55,232

[52] U.S. Cl. .................................................. 106/84
[51] Int. Cl. ...................... C04b 35/14, C04b 35/16
[58] Field of Search ................... 106/74, 84; 264/82

[56] References Cited
UNITED STATES PATENTS

| | | | |
|---|---|---|---|
| 3,498,802 | 3/1970 | Bickford et al. | 106/74 |
| 2,240,393 | 4/1941 | Dietz | 106/84 |
| 2,492,790 | 12/1949 | Farkas et al. | 106/84 |
| 2,662,022 | 12/1953 | Dietz | 106/84 |

*Primary Examiner*—James E. Poer
*Attorney*—Waters, Roditi, Schwartz & Nissen

[57] ABSTRACT

Disclosed herein is a method of obtaining chemical resistant concrete, the essence of the method consisting in that use is made as starting components of the concrete binder, of high-silica alkaline glass with a silica modulus in excess of 6, and quartz sand comminuted into particles with a specific surface of at least 1,000 $cm^2gr$.

3 Claims, No Drawings

METHOD OF OBTAINING CHEMCIAL RESISTANT CONCRETE

This invention relates to a method of obtaining chemical resistant concrete for use in industrial, hydraulic-engineering and underground construction of buildings and structures that are to operate under conditions in which they are subject to chemically active media, especially acid ones, as well as for use in the constructing of heat-generation plants.

Known in the art is a method of obtaining chemical resistant concrete based on a binder whose basic components are vitreous sodium silicates or potassium silicates with a silica modulus of less than 4.

As a result of dissolving vitreous silicate in water, soluble glass is obtained.

With the purpose of making liquid glass solidifiable and increasing its water-proofness some additives are introduced into the composition of the concrete, such as sodium silicofluoride, which additives neutralize the alkali in liquid glass and convert it into water-insoluble compound In the course of alkali neutralization a free silica is evolved from the liquid glass in the form of a gel which serves as a binder, i.e., it cements the particles of the concrete aggregate and, after having been dehydrated under dry conditions, imparts strength to the resulting concrete.

Since silical gel serves in the above case as a cementing agent such a concrete is not attackable by most of the high-concentration mineral acids but is likely to quickly fall apart in alkaline-reaction solutions. Furthermore it features but low stability in water, aqueous solutions and water-steam media which interferes with its being widely applied as a chemically resisting construction material.

Likewise restricted is the application of a liquid-glass based concrete as an acidproof lining material, this being due to the toxicity of sodium silicofluoride and its being completely permeable to agressive solutions.

Moreover, the low heat-resistant properties of the binder trammel its application in chemically resisting fireproof concretes.

It is an object of the present invention to eliminate the disadvantages mentioned above.

It is a specific object of the present invention to provide a method of obtaining chemical resistant concrete based upon a binder in the form of a free silica and involving the use, as the basic binder components, of such substances in amounts that make the resulting concrete chemically resistant to both acids and alkalis of any concentration, solutions of salts, as well as make the concrete absolutely waterproof, non-toxic, impart to it excellent physico-mechanical and thermal properties and, whenever necessary, impermeability to agressive solutions.

The above and other objects are accomplished due to the fact that for obtaining chemical resistant concrete, according to the invention, use is made as the basic binder components of high-silica alkaline glass with a silica modulus not in excess of 6, in an amount of 20 to 60 weight percent, and quartz sand comminuted into particles with a specific surface of at least 1,000 sq.cm/gr. in an amount of 80 to 40 weight percent.

The essence of the present invention resides in the following:

With the silica modulus of the liquid glass in excess of 6 the essential quantity of vitreous silica is in a free state, not bound into silicates. Therefore, high-silica glasses are practically insoluble in water even at elevated temperatures and are not suitable for obtaining liquid glass.

However, when subjected to heat and wet treatment jointly with finely comminuted quartz sand, silica glass exhibits water solubility and ability to crystallize into quartz on particles of comminuted quartz sand as in innoculating crystals or seeds.

This is explained by the fact that the solubility of vitreous silica in water under similar conditions is considerably higher than that of quartz (crystalline silica). Therefore, a silica solution in the make-up water that occurs, in order to be saturated with respect to glass, will be supersaturated with respect to quartz.

This fact is responsible for a spontaneous deposition (crystallization) of excess silica on quartz particles in the form of quartz occurring in the course of heat and wet treatment.

Besides, an additional amount of silica is passed into the solution depleted in silica from high-silica glass, whereupon the whole process is repeated until a complete dissolution of glass and its crystallization on the particles of finely comminuted quartz sand occur.

Growth of quartz particles due to dissolution and crystallization of high-silica glass results in the particles' being intergrown along the contact surfaces, i.e., in solidifying of the binder and concrete.

Thus, in the present invention, use is made as a binder of unfixed silica not in the form of gel but as a more thermodynamically and chemically stable crystalline variety of unbound silica, that is, quartz. This is a decisive factor in the obtaining of excellent chemical, physical, thermal and mechanical characteristics of the binder and the chemical resistant concrete based thereon.

The spirit of this invention will be better understood from a consideration of specific exemplary embodiments of the method disclosed herein.

To obtain chemical resistant concrete, there were used: high-silica glass with a silica modulus of 9.3 of the following weight percentage composition: $SiO_2$—90; $Na_2O$—10, in the form of grains of a size of 0.6 to 1.25 mm; finely dispersed high-silica glass and quartz sand comminuted into particles with a specific surface of 3,000 sq.cm/gr as an additive; and fine quartz sand with a size modulus of 1.15 as an aggregate.

The above-listed components were intermixed in a concrete mixer, water was added, whereupon the mixture was agitated until a homogeneous concrete mass was obtained.

The following amount of constituents were used to obtain 1 cu.m. of concrete mass (in kg):
- high-silica glass (in grains)—350
- high-silica glass (ground)—50
- sand aggregate—1120
- sand additive—400
- water—225

Utilization in the above example of granulated glass with a grain size of 0.6 to 1.25 mm and quartz sand as an aggregate made it possible to cardinally decrease the original surface area of the binder and thereby to obtain a concrete mixture with a minimum water-binder ratio and higher concrete density compared to concrete based upon finely comminuted glass.

From the concrete mixture thus obtained there were shaped rectangular specimens measuring 4×4×16 cm and and figure-eight specimens which were then subjected to autoclave precessing at 190° C. After having been dried, the concrete showed the following characteristics:
ultimate strength, kg/cm$^2$:
   compression—470.2–611.0
   bending—136.1–146.7
   tensile—62.1– volume weight, t/m$^3$ —1.93
frost resistance (in freezing-and-thawing cycles-)—minimum 300
acid resistance as found by loss in weight after boiling comminuted concrete in sulphuric acid during 1 hour, percent—99.52
alkali resistance as found by loss in weight after boiling comminuted concrete during 1 hour, percent:
a. in a 35-percent solution of sodium hydroxide—81.56
b. in a solution of sodium hydroxide at $10^{-2}$ mol/lit. concentration and pH = 12—98.43
Fire-proofness of the concrete with sand aggregate precalcined at 1,200°C to convert quartz into tridymite, °C.—1,670

The production technique described above is instrumental in obtaining chemically resisting concrete of other compositions. Given below is a table containing data on concrete composition and properties.

Due to its high chemical, physical and mechanical characteristics, concrete obtainable by the herein-disclosed method can find widespread application in making construction structures, in erecting buildings and edifices designed to be in service under conditions of agressive media, whereby their service life is increased 2 or 3 times. Application of the concrete as a fireproof material for making large sized members for heat-generation plants instead of brick allows of substantially decreasing labor consumption in the erection of such constructions, reducing consumption of materials due to more reasonable design principles, and enhancing the reliability and service life thereof.

| Nos. | Concrete mixture composition, kg./lit. | | | | | | | Characteristics of concrete | | | | |
|---|---|---|---|---|---|---|---|---|---|---|---|---|
| | High silica sodium glass | | | Comminuted quartz sand | | Sand aggregate | | Main water | Strength, kg./cm.$^2$ | | Chemical resistance, percent (minimum) | |
| | Silica modulus | Quantity | Grain size, mc. | Quantity | Specific surface, cm.$^2$/gr. | Quantity | Size modulus | | Compression | Bending | Acid resistance at pH=12 | Alkali resistance at pH=1 |
| 1 | 7.5 | 0.6 | 140–315 | 0.4 | 5,800 | 0.9 | 2.21 | 0.20 | 719.5 | 149.8 | 99.0 | 97.8 |
| 2 | 6.9 | 0.35 | <56 | 0.4 | 5,800 | 1.2 | 1.15 | 0.26 | 214.1 | 48.2 | 99.0 | 96.9 |
| 3 | 7.5 | 0.4 | 315–630 | 01.4 | 1,100 | | | 0.28 | 427.5 | 102.6 | 99.0 | 97.8 |
| | High silica potassium glass | | | | | | | | | | | |
| 4 | 14.1 | 0.4 | 630–1,250 | 0.4 | 3,000 | 1.12 | 1.15 | 0.22 | 646.4 | 158.3 | 99 | 98 |

What is claimed is:

1. A method of preparing chemical resistant concrete comprising mixing alkali high-silica glass having silica modulus of more than 6 and quartz sand comminuted to a specific surface area of at least 1,000 cm$^2$/g, said glass being present in an amount of 20–60 wt.% and said sand in an amount of 40–80 wt.%; adding water to the resulting mixture, and repeating the mixing step until a uniform plastic mixture is obtained; molding the desired articles from said uniform plastic mixture; and subjecting the resulting molded articles to autoclave treatment for a period of time sufficient for causing said glass to dissolve completely and for allowing the quartz to crystallize out of the solution onto the surface of particles of said quartz sand.

2. A method as claimed in claim 1, comprising adding quartz sand as a filler into said resulting mixture together with said water.

3. A method as claimed in claim 1 wherein the alkali high-silica glass has a grain size in the range of 140-to 1,250-microns and the autoclave treatment is conducted at a temperature of 190°C.

* * * * *